US008566716B2

(12) United States Patent
Haynes et al.

(10) Patent No.: US 8,566,716 B2
(45) Date of Patent: Oct. 22, 2013

(54) SELECTIVE MACRO EVENT RECORDING

(75) Inventors: Thomas R. Haynes, Apex, NC (US);
Douglas A. Larson, Raleigh, NC (US);
Srinivasan Muralidharan, Apex, NC (US); Ki H. Park, Cary, NC (US);
Shirish Amin, Cary, NC (US); Robin L. Yehle, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1975 days.

(21) Appl. No.: 11/032,822

(22) Filed: Jan. 10, 2005

(65) Prior Publication Data

US 2006/0155954 A1 Jul. 13, 2006

(51) Int. Cl.
*G06F 3/00* (2006.01)

(52) U.S. Cl.
USPC .......................................................... 715/704

(58) Field of Classification Search
USPC .......................................................... 715/704
See application file for complete search history.

(56) References Cited

U.S. PATENT DOCUMENTS

| 5,166,890 | A | | 11/1992 | Smischny |
|---|---|---|---|---|
| 5,483,468 | A | | 1/1996 | Chen et al. |
| 6,067,478 | A | * | 5/2000 | Srivastava et al. ............... 700/86 |
| 6,243,707 | B1 | * | 6/2001 | Humpleman et al. ........ 707/102 |
| 6,336,149 | B1 | * | 1/2002 | Preston ............................. 710/1 |
| 6,357,038 | B1 | * | 3/2002 | Scouten ........................ 717/122 |
| 6,453,435 | B1 | * | 9/2002 | Limon et al. .................. 714/724 |
| 6,693,651 | B2 | | 2/2004 | Biebesheimer et al. |
| 7,036,079 | B2 | * | 4/2006 | McGlinchey et al. ......... 715/704 |
| 7,200,804 | B1 | * | 4/2007 | Khavari et al. ................. 715/513 |
| 2002/0180801 | A1 | | 12/2002 | Doyle et al. |
| 2003/0007006 | A1 | | 1/2003 | Baar et al. |
| 2005/0278630 | A1 | * | 12/2005 | Bracey .......................... 715/704 |
| 2005/0278728 | A1 | * | 12/2005 | Klementiev .................. 719/328 |
| 2006/0005132 | A1 | * | 1/2006 | Herdeg, III .................... 715/704 |

OTHER PUBLICATIONS

Cowart et al, "Special Edition Using Microsoft Windows XP Home Edition", Oct. 10, 2001, Que.*
*A Visual Test Development Environment for GUI Systems*, Thomas. Ostrand, et al., Siemens Corporate Research, 755 College Road East, Princeton, NJ 08540, 1998.
*The State of the Art in Automating Usability Evaluation of User Interface*, Surveys, vol. 33, No. 4, Dec. 2001, pp. 470-516.
*Exploring Context Switching and Cognition in Dual-View Coordinated Visualizations*, Gregorio Convertino, et al., Proceedings of The Cooridnated & Multiple Views in Exploratory Visualization ISBM 0-7695-1977-6, 2003 IEEE.
*General Purpose Data Collection Method*, IBM Technical Disclosure Bulletin, Nov. 1973, pp. 1796-1798.

* cited by examiner

*Primary Examiner* — Alvin Tan
(74) *Attorney, Agent, or Firm* — Steven M. Greenberg, Esq.;
Carey, Rodriguez, Greenberg & O'Keefe

(57) ABSTRACT

A method, system and apparatus for selective macro event recording. In accordance with the present invention, events can be selectively included in a macro recording process, even where the events occur across different contexts such as different application windows in different applications. Specifically, once a macro recording session has been initiated for a particular application or application window, events occurring in different applications or application windows can be selected for inclusion in the macro through an append recording operation. Notably, the selective macro recording facility can be included as part of an operating environment, or as part of the individual applications executing within the operating environment.

2 Claims, 3 Drawing Sheets

SELECTIVE MACRO EVENT RECORDING

BACKGROUND OF THE INVENTION

1. Statement of the Technical Field

The present invention relates to macro recording facilities in an application execution environment and more particularly to recording events in a macro recording session.

2. Description of the Related Art

Macro recording facilities long have provided operational efficiencies to software applications and, as such, have formed an important functional component of software applications for many years. Generally speaking, macro recording facilities refer to logic which permits the recording of a series of user interface operations performed by an end user when interacting with an underlying software application. The recorded series of operations often is referred to as a "macro" and can stored in a file which further can be manipulated, copied, deleted and the like just as any other file can be manipulated, copied, or deleted. By comparison to macro recording facilities, macro playback facilities refer to logic which permits the automated playing back of a recorded series of user interface operations as if each of the operations in the series had been performed in real-time by an end user.

Macro recording and playback facilities have been included both as part of individual software applications and also as part of an underlying operating system. In both cases, end users can activate macro recording by selecting a user interface element, typically "Macro Record". Once activated, all user interface interactions can be recorded, including mouse-clicks, keyboard strokes, menu selections, and the like. The selection of a "Macro Stop" user interface element can cause the cessation of the recording exercise and the recorded interactions can be stored in a single file or in a database configured to accommodate recorded macros.

In early computing, macro recording and playback facilities remained simple due to the simplified nature of operating systems and their inability to handle more than one task and one user interface at any one time. Accordingly, the context for recording a macro remained clear and consistent throughout the macro recording process. More particularly, in early computing, when a user activated macro recording, it remained quite clear to the macro recording logic that all recordable events occurring during the recording session belonged to the same context.

Today, multi-window, multi-tasking environments have complicated matters and it no longer remains clear which events are intended to be included as part of the macro recording process. Specifically, to the extent that a macro recording operation has been activated in the course of execution of one application, events and interactions arising during the execution of other applications may have been intended to be excluded from the macro recording operation. Conversely, events and interactions arising during the execution of other applications may have been intended to be included as part of the macro recording operation. In either case, at present macro recording facilities can be configured either to capture all events, regardless of context, or only those events arising in a single context.

SUMMARY OF THE INVENTION

The present invention addresses the deficiencies of the art in respect to macro recording across multiple recording contexts and provides a novel and non-obvious method, system and apparatus for selective macro event recording. In this regard, a selective macro event recording method can include selectively enabling and disabling the appending of events associated with a first application context into a macro subject to a macro recording session for events which are associated with a second application context. Preferably, the step of selectively enabling and disabling can include receiving a request to append events from the first application context to an existing macro recording session; identifying the existing macro recording session; and, recording subsequently occurring events in the first application context into the identified existing macro recording session.

The receiving step can include the step of receiving a user interface event for the request from a user interface element disposed in the first application context. Alternatively, the receiving step can include the step of receiving a user interface event for the request from a user interface element disposed in an operating system hosting the first application context. In either case, the identifying step can include retrieving a list of active macro recording sessions; and, selecting one of the active macro recording sessions in the list as the existing macro recording session.

In a preferred aspect of the invention, additional requests can be received to append events from other application contexts to the existing macro recording session. Once received, subsequently occurring events in the other application contexts can be recorded into the identified existing macro recording session. Finally, at any time a request can be received to stop appending events from the first application context to an existing macro recording session. Consequently, the recording of subsequently occurring events in the first application context into the identified existing macro recording session can cease.

A selective macro event recording system can include a macro recording facility; and, an append recording facility. The macro recording facility and append recording facility can be incorporated into a user interface for an application context. Alternatively, the macro recording facility and append recording facility can be incorporated into a user interface for an operating system hosting the application context. In the former case, the macro recording facility and append recording facility can be incorporated into a system menu for the user interface for the application context.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for selective macro event recording. In accordance with the present invention, events can be selectively included in a macro recording process, even where the events occur across different contexts such as different application windows in different applications. Specifically, once a macro recording session has been initiated for a particular application or application window, events occurring in different applications or application windows can be selected for inclusion in the macro through an append recording operation. Notably, the selective macro recording facility can be included as part of an operating environment, or as part of the individual applications executing within the operating environment.

Figure 1:
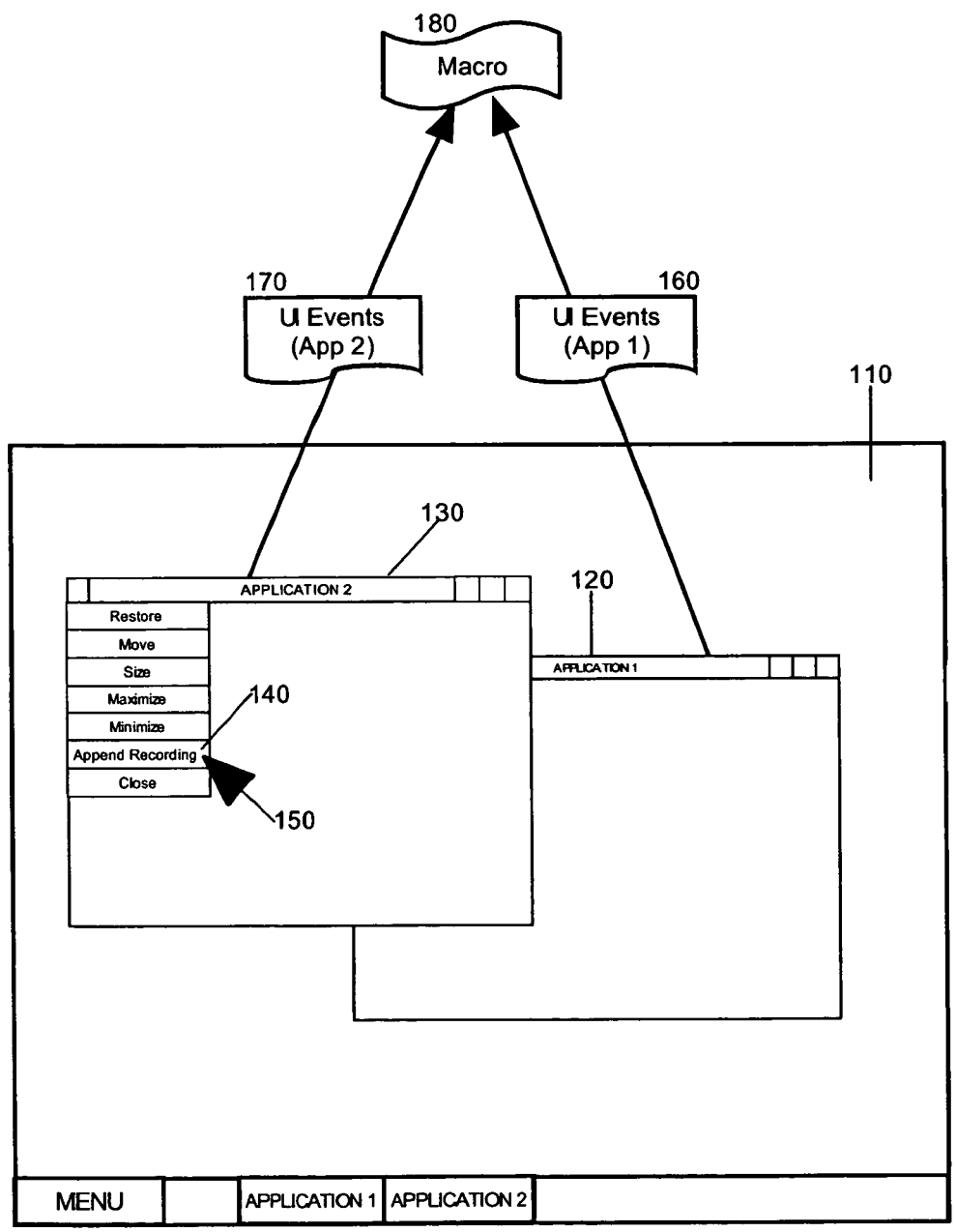
FIG. 1 is a pictorial illustration of a system, method and apparatus configured for selective macro event recording.

FIG. 1 is a pictorial illustration of a system, method and apparatus configured for selective macro event recording. In the system of the present invention, an operating environment 110 can host the execution of one or more computing applications 120, 130. Each of the computing applications 120, 130 can include a user interface through which events can flow. In this regard, events can include user interactions with the application, application initiated occurrences, and application responses to user interactions and application initiated occurrences. As an example, events can include mouse clicks, keyboard strokes, items selections, text input and text output, graphical input and graphical output, audible input and audible output, to name only a few.

Each of the applications 120, 130 can be configured for macro recording, either by way of the individual user interfaces of the applications 120, 130, or by way of the user interface of the operating environment 110. The activation of a macro recording facility while engaged in a first context of an application 120 can cause the events 160 occurring in the application 120 to be recorded to a macro 180. Subsequently, while engaged in a second context of a different application 130, the activation of an append recording facility can cause the events 170 occurring in the application 130 to be additionally recorded to the macro 180.

Importantly, in one aspect of the invention, the user interface for each of the applications 120, 130 can include a macro append control 140 which when selected, for example by way of a mouse pointer 150, can activate the append recording facility. Likewise, each of the applications 120, 130 can include a macro record control (not shown) which when selected can activate the macro recording facility. Of course, each of the applications 120, 130 can include an append stop control (not shown) and macro stop control (not shown) to cease the appendage of events from the context and to cease recording events to the macro, respectively.

In another aspect of the invention, the user interface for the operating environment 110 can include the macro append control which when selected can activate the append recording facility for an active or selected context. Likewise, the operating environment 110 can include a macro record control which when selected can activate the macro recording facility. Of course, each of the operating environment 110 can include an append stop control and macro stop control to cease the appendage of events from the active context and to cease recording events to the macro, respectively.

Figure 2:
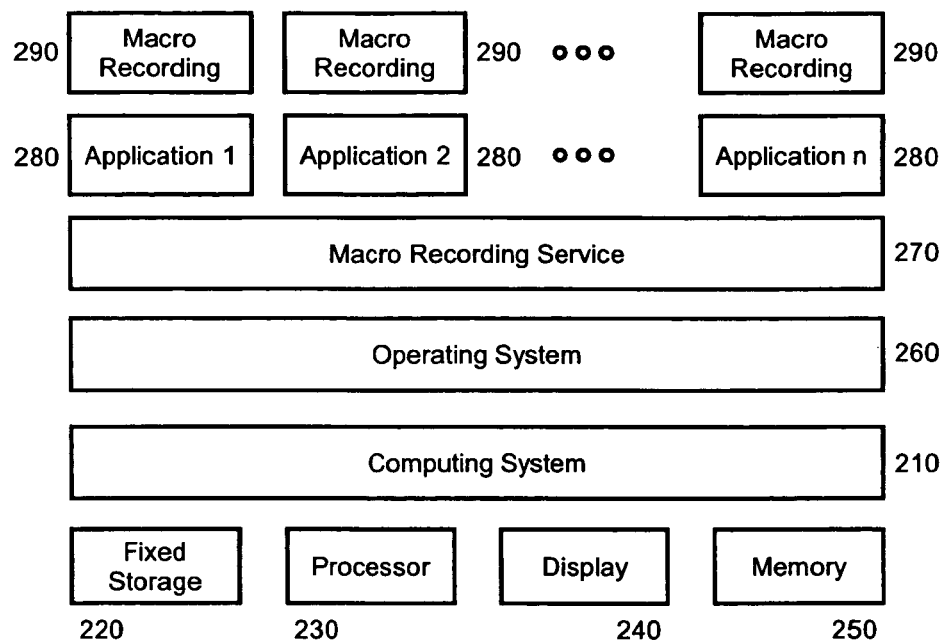
FIG. 2 is a block diagram illustrating a systems architecture configured for selective macro event recording; and, FIG. 3 is a flow chart illustrating a process for selective macro event recording.

In further illustration of the present invention, FIG. 2 is a block diagram illustrating a systems architecture configured for selective macro event recording. The architecture can include a computing system 210 having at least one processor 230, and each of fixed storage 220 and memory 250. A display 240 optionally can be provided. The computing system 210 can host the operation of an operating system 260 which in of itself can host the execution of one or more computing applications 280. Accordingly, the skilled artisan will recognize that the described computing system 210 can be a personal computing device, a pervasive computing device or an embedded computing device, to name only a few possible embodiments.

Notably, in one aspect of the present invention, a macro recording service 270 can be included with the operating system 260. The macro recording service 270 can be configured to record events as they occur in one or more selected ones of the applications 280. In this regard, when activated, the macro recording service 270 can be configured to begin recording a macro for events received in the active context. Alternatively, when activated, the macro recording service 270 can defer the selection of the proper context to the end user by querying the list of active applications and permitting the end user to select a desired context for recording the macro.

In an alternative aspect of the present invention, individual macro recording services 290 can be included with each of the applications 280. In this regard, when operating as the active context, the user interface of the active one of the applications 280 can provide both a record macro facility and an append recording facility. In this way, a new macro can be initiated from the active one of the applications 280. Similarly, when it is desired to add events stemming from the active one of the applications 280 to an existing macro under recording for a different one of the applications, 280, the append recording facility for the active one of the applications 280 can be selected. In the event that multiple macro recording sessions have been activated, a list of executing ones of the applications 280 having active macro recording sessions can be retrieved from the operating system 260 and provided to the end user for selecting a desired macro recording session to which events from the active one of the applications 280 are to be appended.

Figure 3:
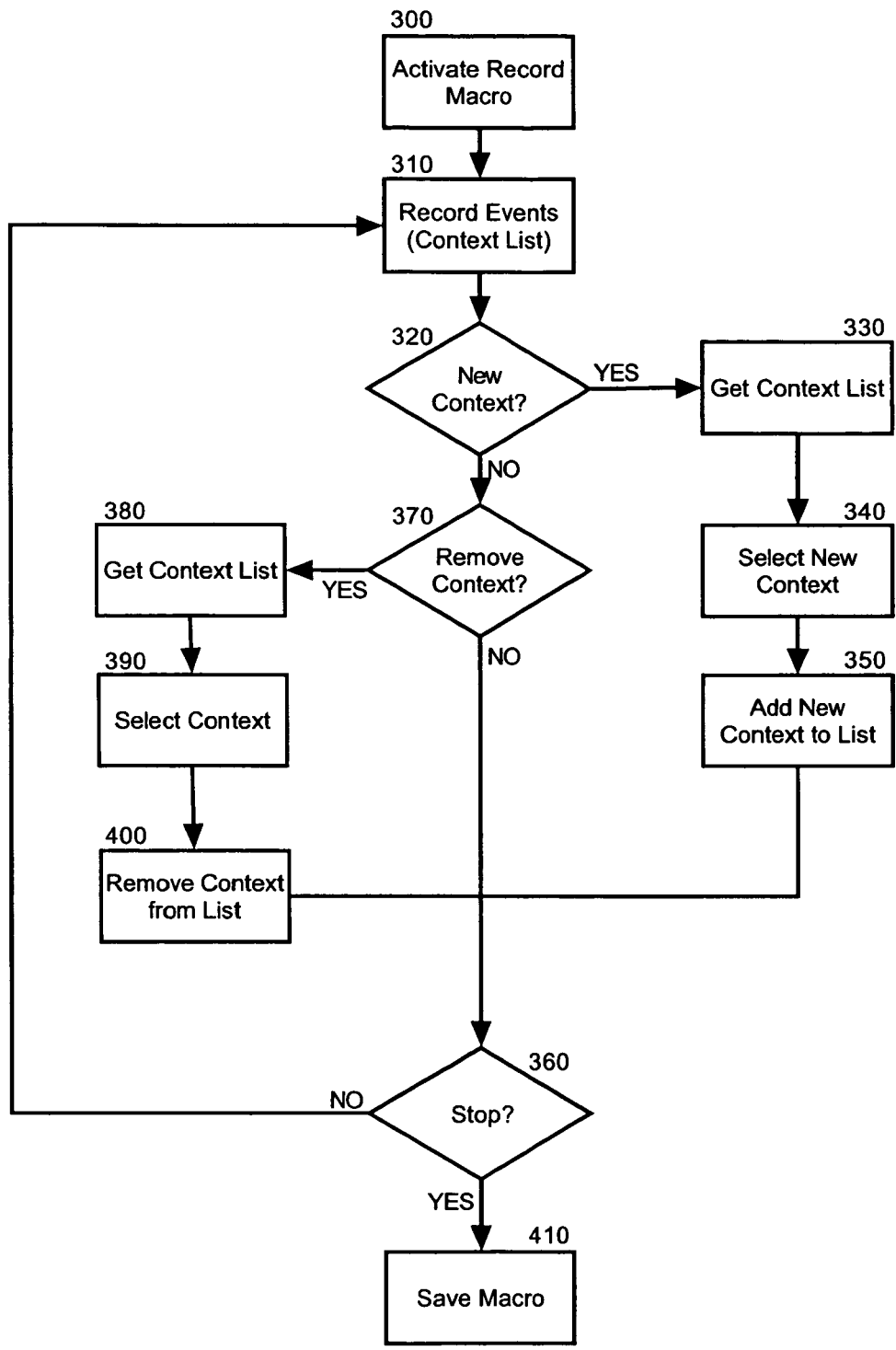

In more particular illustration of the macro append recording process, FIG. 3 is a flow chart illustrating a process for selective macro event recording. Beginning in block 300, the record macro facility can be activated for a specified context. The context can be added to a list of contexts from which events are to be recorded to the macro. In block 310, the events flowing to and from the contexts in the list of contexts can be recorded to the macro. In decision block 320, if a new context is to be added to the list of contexts, in block 330 a list of active contexts can be retrieved. Also, in block 340 a new context can be selected and in block 350 the selected context can be added to the list of contexts. Finally, in decision block 360, if it is determined that the recording of the macro is to continue, the process can repeat through block 310.

In decision block 370, it further can be determined if a context is to be removed from the list of contexts. If so, in block 380 the list of contexts can be retrieved. Subsequently, in block 390, a particular one of the contexts in the list of contexts can be selected. Consequently, in block 400 the selected context can be removed from the list of contexts such that events flowing to and from the removed context no longer will be included in the recorded macro. Finally, in decision block 360, if it is determined that the recording of the macro is to continue, the process can repeat through block 310. Otherwise, the macro can be saved in block 410 and the macro recording process can end.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A selective macro event recording method comprising the steps of:

activating a macro recording facility for a specified context;

adding the context to a list of contexts from which events are to be recorded to a macro;

recording events flowing to and from the contexts in the list of contexts to the macro;

in response to receiving a new context, determining if the new context should be added to the list of contexts based on user selection of the new context from a retrieved list of active contexts;

adding the new context to the list of contexts if it is determined that the new context should be added to the list of contexts; and in response to a determination that a context needs to be removed from the list of contexts, removing the context from the list of context.

2. A hardware storage device having stored thereon a computer program for selective macro event recording, the computer program comprising a routine set of instructions which when executed by a machine causes the machine to perform the steps of:

activating a macro recording facility for a specified context;

adding the context to a list of contexts from which events are to be recorded to the macro;

recording events flowing to and from the contexts in the list of contexts to the macro;

in response to receiving a new context, determining if the new context should be added to the list of contexts based on user selection of the new context from a retrieved list of active contexts;

adding the new context to the list of contexts if it is determined that the new context should be added to the list of contexts; and in response to a determination that a context needs to be removed from the list of contexts, removing the context from the list of context.

\* \* \* \* \*